United States Patent [19]

Akutsu

[11] Patent Number: 4,866,433
[45] Date of Patent: Sep. 12, 1989

[54] VEHICLE LOCKING AND UNLOCKING SYSTEM

[75] Inventor: Shoji Akutsu, Kawasaki, Japan

[73] Assignee: Kokusan Kinzoku Kogyo Kabushiki Kaisha, Tokyo, Japan

[21] Appl. No.: 19,807

[22] Filed: Feb. 27, 1987

[51] Int. Cl.⁴ .............................................. G06F 7/04
[52] U.S. Cl. ........................... 340/825.31; 340/825.69; 307/10.2
[58] Field of Search ........... 340/825.3, 825.31, 825.34, 340/825.54, 825.62, 825.69, 825.72, 63, 528, 542; 70/256, 257, 278; 180/287; 307/10 AT; 361/172

[56] References Cited

U.S. PATENT DOCUMENTS

| | | | |
|---|---|---|---|
| 3,196,440 | 7/1965 | Weinstein | 340/825.31 |
| 3,703,714 | 11/1972 | Andrews | 304/63 |
| 3,891,980 | 6/1975 | Lewis et al. | 340/825.31 |
| 4,143,368 | 3/1979 | Route et al. | 340/63 |
| 4,236,594 | 12/1980 | Ramsperger | 307/10 AT |
| 4,471,343 | 9/1984 | Lemelson | 307/10 AT |
| 4,670,746 | 6/1987 | Taniguchi et al. | 340/52 D |
| 4,672,375 | 6/1987 | Mochida et al. | 70/257 |
| 4,688,036 | 8/1987 | Hirano et al. | 70/257 |
| 4,719,460 | 1/1988 | Takeuchi et al. | 307/10 AT |
| 4,737,784 | 4/1988 | Hirano | 340/825.31 |

Primary Examiner—Donald J. Yusko
Assistant Examiner—Edwin C. Holloway, III
Attorney, Agent, or Firm—Fleit, Jacobson, Cohn, Price, Holman & Stern

[57] ABSTRACT

When an outside handle switch, a trunk cylinder switch, a glove box switch, or the like is caused to be in an on position, a combined transmitter/receiver circuit is caused to operate through an input discriminator. The input discriminator will initiate wireless communication between a user side main controller and a subcontroller through the intermediary of an antenna. The user side main controller is formed into a card and includes a loop antenna, a combined transmitter/receiver circuit, and a microcomputer. The user side subcontroller is formed into a card and includes a loop antenna, a combined transmitter/receiver circuit, and a microcomputer. When the combined circuit receives a signal from the main card lock and subcard lock, the signal is forwarded to the user side controller position discriminator circuit. This position discriminator discriminates the vehicle outside or vehicle inside position of the main card lock and the subcard. The signal from the main card lock and the subcard is preserved provisionally in the vehicle side main controller and is then transmitted to the user side controller discriminator circuit. When the discriminator circuit receives signals from the main card lock and the subcard lock, it will discriminate between the combined signal patterns. When the discriminated signal part corresponds to the signal part related to the main card lock, the signal part from the main card lock will be delivered to a pulse conversion circuit. When the discriminated signal corresponds to the signal part related to the subcard, that signal will be transmitted.

1 Claim, 4 Drawing Sheets

FIG. 2
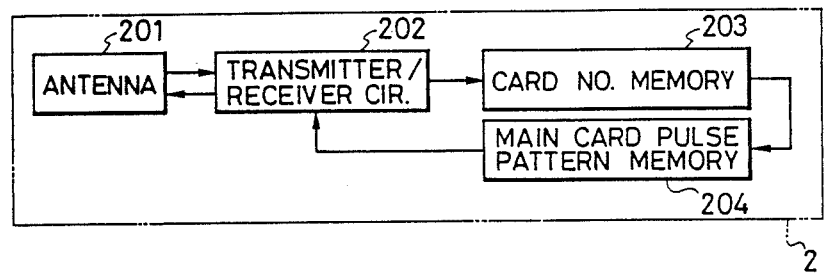
FIG. 3
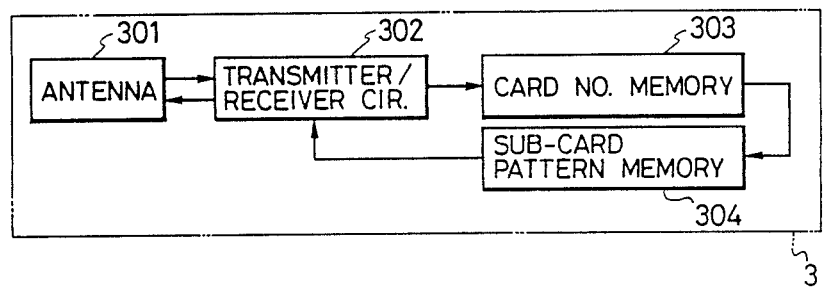
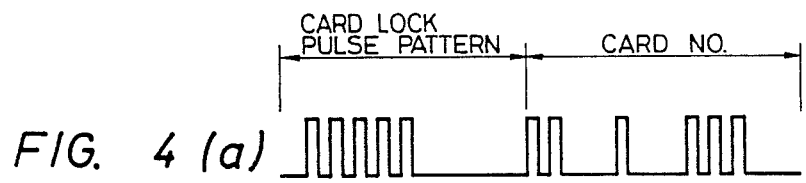
FIG. 4 (a)
FIG. 4 (b)

FIG. 6a
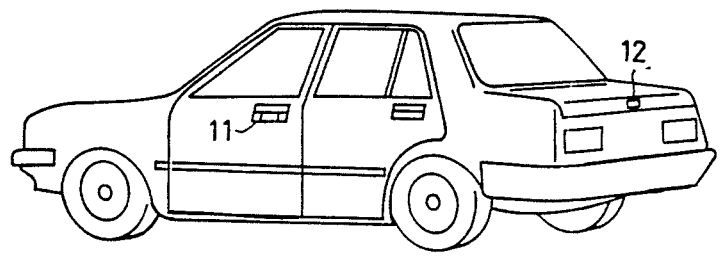
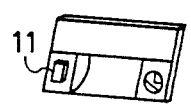
FIG. 6b
FIG. 6c
FIG. 7a
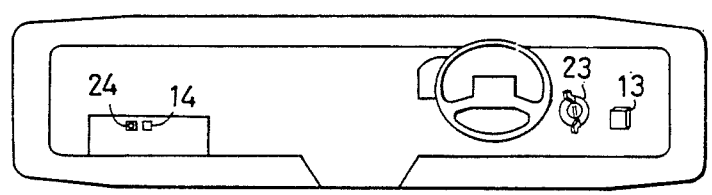
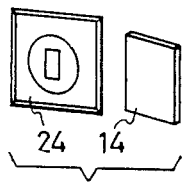
FIG. 7b
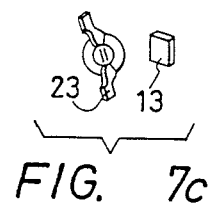
FIG. 7c

VEHICLE LOCKING AND UNLOCKING SYSTEM

BACKGROUND OF THE INVENTION

1. Field of the Invention

This invention relates to improvements in and relating to a, wireless signal controlled vehicle lock system.

2. Disclosure of Prior Art

Rather recently, various and numerous vehicle lock arrangements have been proposed of the above kind.

As a representative embodiment thereof, the system comprises a vehicle side main controller and a user side controller. In this case, a conventional outdoor handle switch, trunk cylinder switch or steering lock switch is made ON, these controllers will initiate mutual wireless communication and when a pulse pattern or the like signal transmitted from the user side controller to the vehicle side controller are in coincidence with a preset and memory code signal, a locking or unlocking signal is delivered to the door lock and the like controller.

SUMMARY OF THE INVENTION

It is an object of the invention to provide an improved wireless signal controlled, vehicle lock system including a door lock, trunk lock, steering lock and the like, for instance, without use of a mechanical subkey at a gasoline station or the like.

Further objects, features and advantages of the invention will become more apparent when reading the following detailed description to be set forth.

In the following, a preferred embodiment of the present invention will be set forth in detail and with reference to the accompanying drawings, in which

BRIEF DESCRIPTION OF THE DRAWINGS

FIGS. 2 and 3 are block diagrams of main and subuser side controllers.

FIG. 4(a) and (b), are representative examples of pulse patterns fed from the main and subcontrollers.

FIGS. 6a, 6b and 6c are schematic outline figures of an outdoor handle switch and trunk cylinder switch.

FIGS. 7a, 7b and 7c are schematic outline figures of a steering lock and a glove box lock switch.

DETAILED DESCRIPTION OF THE PREFERRED EMBODIMENTS

Figure 1:
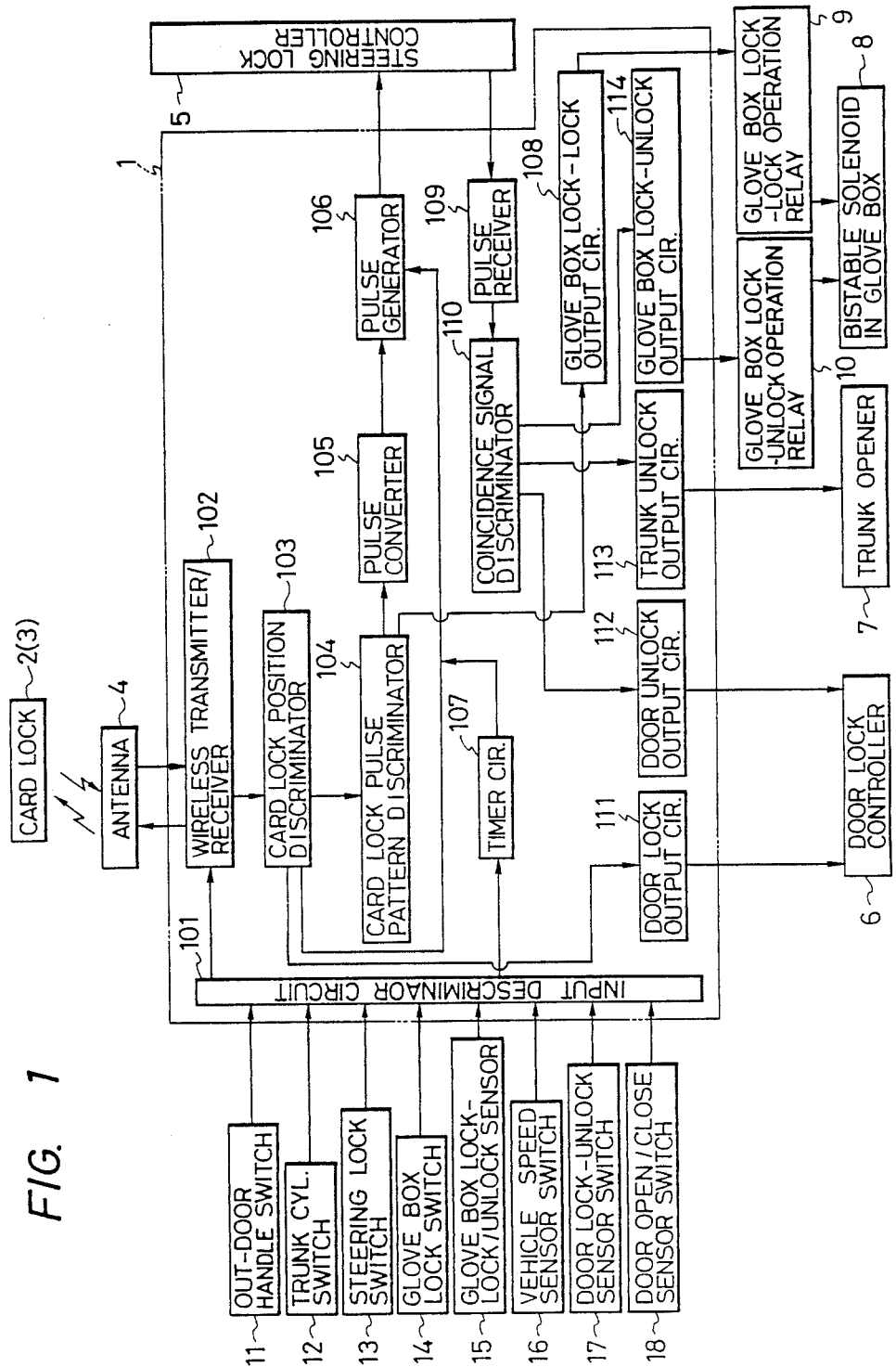
FIG. 1 is a schematic block diagram of the inventive system.

In FIG. 1, numeral 1 represents a vehicle side main controller; 2 represents a user side main controller prefabricated into a card, and thus, it will be referred to as a "main card" lock hereinafter.

Numeral 3 represents a user side sub-controller which is again prefabricated into a card. Thus, it will be referred to as a "subcard" lock hereinafter.

Numeral 4 represents antenna and 5 is a steering lock controller; and 6 a door lock controller; and 7 a trunk opener.

Numeral 8 represents a bistable solenoid mounted in a conventional glove box of the vehicle; 9 glove box a lock/lock operation relay mounted in the glove box; and 10 glove box a lock/unlock operation relay mounted in the glove box.

Numeral 11 represents an out door handle switch which is on/off-controlled with door open-and-closable manipulation handle being moved between an open and closed condition. The switch 11 is shown in its outside appearance only, and in FIG. 6b.

Numeral 12 represents a trunk cylinder switch provided on the trunk lid or the like. This switch 12 is also shown only in its outside appearance in FIG. 6c.

Numeral 13 represents a steering lock switch mounted at a position near to steering lock knob 23, shown in FIG. 7c, and indeed, at a substantially hidden place, so as not to be easily found out by a third person.

Numeral 14 represents a glove box lock switch mounted in the glove box.

Numeral 15 represents a sensor switch adapted for sensing either a locked or unlocked position of the glove box lock.

Numeral 101 represents an input discriminator circuit included in the vehicle side main controller 1. The aforementioned switches 11–18 are connected at their respective output terminals through respective leads (as shown in FIG. 1) to the discriminator 101.

When out door handle switch 11, trunk cyclinder switch 12, glove box lock switch 14 or the like is caused to be on, a combined transmitter/receiver circuit 102 is caused to operate through input discriminator 101 and will initiate wireless communication with user side main controller 2 and -subcontroller 3 through the intermediary of antenna 4.

Although not specifically shown on the drawing, the antenna 4 consists of three remotely positioned, separate antennae elements which are preferably located at hidden positions such as within a side mirror, below the passenger's seat and within the interior space of the vehicle trunk.

User side main controller 2 is formed into a card as was already referred to hereinbefore, and comprises a loop antenna 201; a combined transmitter/receiver circuit 202; a microcomputer (card number memory 203 and master card pulse pattern memory circuit 204).

When the main controller 2 receives a signal from the combined transmitter/receiver circuit 102, specific pulse signals which have been preset in card number memory 203 and master card pulse pattern memory 204, these pulse pattern signals being only representatively shown at (a), FIG. 4, will be transmitted from combined transmitter/ receiver circuit 202 and antenna 201 to combined transmitter/ receiver circuit 102.

The user side subcontroller 3 is formed again into a card, as was referred to hereinbefore and comprises, as is shown in FIG. 3, a loop antenna 301; a combined transmitter/ receiver circuit 302; a microcomputer (card number memory 303; a master card pulse pattern memory 304). When the controller 3 receives signal from the combined circuit 102, preset pulse signals shown representatively at (b), FIG. 4, and preset at card number memory 303; master card pulse pattern memory 304, will be transmitted from the combined circuit 302 and antenna 301 to the combined circuit 102.

When the combined circuit 102 receives signal from main card lock (user side main controller) 2 and subcard lock (user side subcontroller) 3, the signal will be forwarded to user side controller position discriminator circuit 103 which may be referred to hereinafter briefly as "position discriminator". This position discriminator discriminates the occasional vehicle outside- or vehicle inside position of main card lock 2 and subcard 3. The signal from main card lock 2 and subcard 3 is preserved provisionally in vehicle side main controller 1 and then will be transmitted to user side controller discriminator circuit 104 which may be briefly referred to as "discriminator circuit" hereinafter.

When discriminator circuit 104 receives signals from main card lock 2 and subcard lock 3, it will discriminate from the combined signal patterns (a); (b) either part issued from main card lock 2 or subcard lock 3. When the discriminated signal part corresponds to the signal part related with main card lock 2, the signal part from the latter will be delivered to pulse conversion circuit 105. On the contrary, when the discriminated signal at discriminator circuit 104 corresponds to the signal part related with the subcard 3, that signal will be delivered to pulse conversion circuit 105. In this case, vehicle side main controller 1 will terminate its feed-out of unlock signal from trunk unlock output circuit 113 to trunk opener 7 as well as its feed-out of unlock signal from glove box lock-unlock signal output circuit 114 to glove box lock-unlocking operation relay 10 due to a lack of coincidence at coincidence signal discriminator 110, as shown in FIG. 1, and as explained below.

Pulse conversion circuit 105 will convert signals of main card lock 2 and subcard lock 3 into pulse signals to steering lock controller 5. This pulse signal is fed from pulse generator 106 to steering lock controller 5. At this stage, pulse generator circuit 106 delivers pulse signals upon reception of output from position discriminator circuit 103 and so far as timer circuit 107 delivers signals therefrom.

Figure 5:
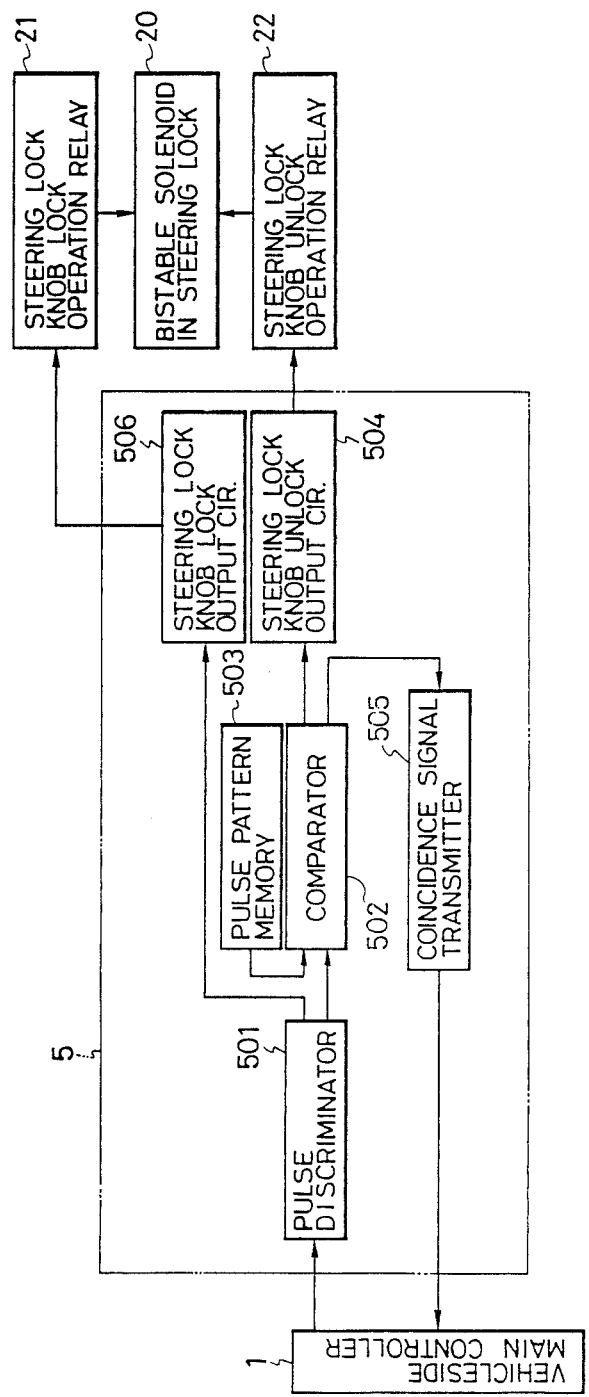
FIG. 5 is a block diagram of the steering lock controller

Vehicle side main controller 1 further comprises pulse receiver circuit 109 which receives signals from coincidence signal sender 505, shown also in FIG. 5, of steering lock controller 1. The signal fed to pulse receiver circuit 109 will be forwarded to coincidence signal discriminator 110.

When, at this stage, a signal is fed from out door handle switch 11 as an example to input discriminator circuit 101, a signal will be fed from coincidence discriminator circuit 110 to door unlock output circuit 112. On the other hand, when a signal is fed from trunk cylinder switch 12 to input discriminator circuit 101, a signal will be fed from coincidence discriminator circuit 110 to trunk unlock circuit 113. When a signal is fed from glove box lock switch 14 to input discriminator circuit 101, a signal will be fed from coincidence discriminator circuit 110 to glove box lock unlock output circuit 114.

Next, steering lock controller 5 will be explained more in detail at the present stage. As shown in FIG. 5, a pulse discriminator circuit 501 is provided for reading out the pulse signals from pulse generator 109 of vehicle side main controller 1, said signals being only representively and schematically shown at (a); (b) in FIG. 4, of which those corresponding to the part related with a card number portion. The thus read-out signal part is fed to the comparator 502 and subjected to comparison herein with the preset pulse pattern (code signal) beforehand in the memory 503. When there B a coincidence, a coincidence signal will be fed to steering lock knob unlock output circuit 504 and coincidence signal sender circuit 505.

When steering lock knob unlock output circuit 504 receives a signal from comparator 502, it delivers a signal to steering lock knob unlock operation relay 22.

When a coincidence signal is received at coincidence signal sender circuit 505, the latter will deliver a signal to pulse receiver circuit 109 of vehicle side main controller 1.

Now returning to FIG. 1, numeral 16 represents a vehicle speed sensor switch which delivers an output signal when the vehicle speed exceeds a predetermined value.

Numeral 17 represents a door lock/unlock sensor switch which is capable to deliver a high potential level signal when the door is locked.

Numeral 18 represents a door opening/closure sensor switch which is operated to ON or OFF when the door is opened or closed, respectively. When the door is opened, it will deliver a high potential level signal.

Numeral 108 represents a glove box lock-locking output circuit which operates in such a way that when the glove box lock switch 14 is kept ON and the glove box lock unlock switch 15 senses unlock state of the glove box lock and delivers a signal output to the relay 9.

The operation is as follows:

(1) Unlocking operation of the door as well as the steering lock knob 23 will be described.

When the user carries personally, either the main card lock 2 or subcard lock 3 and makes the outhandle switch 11 ON, the signal fed from input discriminator circuit 101 will actuate wireless signal transmitter/receiver combined circuit 102 to initiate communication with main card lock 2 or subcard lock 3.

At the vehicle main controller 1, a pulse signal transmitted from main card lock 2 or subcard lock 3 is memorized. A pulse signal preset for unlocking bistable solenoid 20 in the steering lock 19 is fed from pulse generator 106 to pulse discriminator circuit 501.

At the discriminator 501, the pulse signal is discriminated if it is the pulse signal adapted for feeding to steering controller 5 or not, and upon the job has been completed, it will be fed to comparator 502. Then, comparison is made at this comparator between the input pulse signal and the preserved pulse pattern at the memory 503, and when there is a coincidence therebetween, a signal will be fed to steering lock knob unlocking output circuit 504 as well as coincidence signal transmitter circuit 505.

By adopting the above kind measure, an output signal can be fed from the steering lock knob-unlocking output circuit 504 to steering lock knob-unlocking operation relay 22 which actuates the bistable solenoid 20 in the steering lock for making the the knob 23 rotatable and thus kept at its inlocked position.

At this stage, a signal will be fed from coincidence signal transmitter circuit 505 to pulse receiver circuit 109 of the vehicle side main controller 1, thereby a coincidence signal being fed from the said circuit 109 to the discriminator 110. Since a signal has been fed from outhandle switch 11 to the discriminator 101, a signal will be fed therefrom to the door unlock output circuit 112. As a result, unlocking signal will be fed from the circuit 112 to door lock controller 6 for unlocking the door.

(2) The case for locking the door and steering lock knob will be described.

When the user carries the main card lock 2 or subcard lock 3 and goes out from the vehicle interior to make the already unlocked outhandle mutual wireless communication between vehicle side main controller 1 on the one hand and main card lock 2 and subcard lock 3 on the other, thereby the discriminator 103 acknowledges the position of these both locks 2 and 3. If main card lock 2 and subcard lock 3 are left in the vehicle interior, no further effective operation could be invited.

Under these conditions, and for bringing steering lock knob 23 to its unrotatable position (for bringing the bistable solenoid 20 in the steering lock to its locked state), the beforehand preset pulse signal is fed from pulse generator 106 to steering lock controller 5. This signal will be fed from pulse discriminator 501 through steering lock knob-locking output circuit 506 to relay 21, thereby bistable solenoid 20 being driven for making the knob 23 to an unrotatable position.

On the other hand, at the side of main controller 1, a signal will be fed from position discriminator 103 to circuit 111. A locking signal will be fed therefrom to door lock controller 6. Thus, the door is locked.

(3) Locking operation for steering lock knob 23 relying upon the judgement at the side of vehicle side main controller 1, will be described.

When the user should leave the vehicle with the door left in its unlocked state and when the knob 23 is left at its rotatable condition, there may be a risk of theft.

In this case, and at the side of vehicle side controller 1, if ACC-line of the ignition switch 24 (see also FIG. 7) is not fed with positive voltage and within a predetermined time period after bringing steering lock knob 23 into its unlocked position, a predetermined and preset pulse signal is fed to steering lock controller 5 for bringing the steering lock knob 23 to its unrotatable position, as was the case in the above case (2).

I claim:

1. Wireless signal controlled vehicle locking and unlocking system, comprising in combination:
    a vehicle side main controller,
    a user side controller including a main controller and a sub-controller,
    an out door handle switch for generating a signal representative of a door handle being manipulated to an open position or remaining in a closed position,
    a trunk cylinder switch,
    a steering lock switch mounted adjacent to a steering lock knob,
    a glove box lock switch mounted adjacent to a glove box,
    a glove box sensor switch for sensing a locked or unlocked position of said glove box,
    a speed sensor switch for generating a signal when the vehicle speed exceeds a predetermined value,
    a door lock/unlock sensor switch for generating a signal when a door of the vehicle is locked,
    a door open/closed sensor switch for generating a signal when the door is opened,
    an input discriminator circuit provided in said vehicle side main controller, said input discriminator circuit being connected by respective leads to respective output terminals of said out door handle switch, said trunk cylinder switch, said steering lock switch, said glove box lock switch, said glove box sensor switch, said speed sensor switch, said door lock/unlock sensor switch, and said door open/closed sensor switch for initiating wireless communication with said user side controller upon receipt of a signal from at least one of said respective output terminals,
    wireless transmitter/receiver means for establishng and maintaining wireless mutual communication between said vehicle side main controller and said user side controller,
    a user side controller position discriminator circuit provided in said vehicle side main controller for receipt of a signal from said wireless transmitter/receiver means when a signal is received by said wireless transmitter/receiver means from said main controller and said sub-controller,
    a discriminator circuit provided in said vehicle side main controller for receiving signals from said main controller and said sub-controller from said user side controller position discriminator circuit,
    a pulse converter for receiving a signal from said discriminator circuit when said signal from said main controller matches a predetermined signal stored by said discriminator circuit,
    a pulse generator for receiving signals from said pulse converter,
    a steering lock controller for reading signals from said pulse generator, comparing said signals with a predetermined pulse pattern and upon coincidence of said signals and said pulse pattern feeding a coincidence signal to a steering knob unlock output circuit and to a coincidence signal transmitter circuit,
    a steering lock knob unlock operation relay for moving a bistable solenoid steering lock upon receipt of a signal from said coincidence signal transmitter circuit.

* * * * *